United States Patent
Wolters

(10) Patent No.: US 6,318,673 B1
(45) Date of Patent: Nov. 20, 2001

(54) STRUCTURE FOR THE THERMAL INSULATION OF SATELLITES

(75) Inventor: Reinhard Wolters, Salem (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/493,137

(22) Filed: Jan. 28, 2000

(30) Foreign Application Priority Data

Jan. 29, 1999 (DE) .............................................. 199 03 386

(51) Int. Cl.[7] ...................................................... B64G 1/00
(52) U.S. Cl. .................................... 244/158 R; 244/158 A
(58) Field of Search ............................. 244/158 R, 129.1

(56) References Cited

U.S. PATENT DOCUMENTS

| | | | |
|---|---|---|---|
| 4,849,276 | * | 7/1989 | Bendig et al. ........................ 428/117 |
| 4,925,134 | * | 5/1990 | Keller et al. ........................ 244/158 A |
| 4,964,936 | * | 10/1990 | Ferro ....................................... 156/242 |
| 5,030,518 | * | 7/1991 | Keller ...................................... 428/550 |
| 5,337,980 | * | 8/1994 | Homer et al. ..................... 244/158 R |
| 5,514,726 | * | 5/1996 | Nichols et al. ....................... 521/152 |
| 5,565,254 | * | 10/1996 | Norvell ................................... 428/71 |
| 5,670,758 | | 9/1997 | Borchers et al. . |
| 5,731,777 | * | 3/1998 | Reynolds .................................. 342/4 |
| 6,097,327 | * | 8/2000 | Byquist et al. ........................... 342/2 |

FOREIGN PATENT DOCUMENTS 0 780 304 A1    6/1997    (EP) .

* cited by examiner

Primary Examiner—Peter M. Poon
Assistant Examiner—Kevin Jakel
(74) Attorney, Agent, or Firm—Crowell & Moring LLP

(57) ABSTRACT

A thermal insulation structure for satellites comprises a layer of an open-pore polyimide foam applied to the surface of the bearing structure of the satellite.

7 Claims, 1 Drawing Sheet

STRUCTURE FOR THE THERMAL INSULATION OF SATELLITES

BACKGROUND AND SUMMARY OF THE INVENTION

This application claims the priority of German patent document 199 03 386.2, filed Jan. 29, 1999, the disclosure of which is expressly incorporated by reference herein.

The invention relates to a structure for the thermal insulation of satellites.

The necessity for insulating spacecraft against the extreme thermal influences of space is a generally recurring problem of satellite construction. The process of designing, producing, adapting and finally mounting such thermal insulation (usually by means of the so-called multi-layer insulation (MLI) technique, described below) is costly in terms of both time and expense, as explained in detail on the example of solar generators mounted on the satellite.

Stationary solar generators (whose rear-side heat radiation capacity is impaired by the satellite body) become extremely hot during phases of vertical sun irradiation (typically +100° C.), but cool down significantly when in the earth's shadow. Thus, high-expenditures for interior insulation are required so that these high temperature fluctuations will not be introduced into the satellite.

In general, solar generators usually have the following mechanical construction (for example, ROSAT, CLUSTER satellites):

1. The solar cells are glued to the exterior side of a sandwich-type panel with cover layers of carbon-fiber reinforced plastic (CFK). This plastic material as well as the cellular glass have a similar coefficient of thermal expansion, thus reducing the risk of detachment of the cells during temperature fluctuations.
2. A multi-layer insulation (MLI) is situated on the rear side of the sandwich-type panel. These are thin foils (typically, a thickness of 0.01 mm) which are placed above one another and are aluminum-coated on both sides by vaporizing. Mutual contact between the individual foils is minimized by means of thin plastic nets or by the structuring of the foils, so that transfer can occur only by radiation exchange between the foils, which is, however, significantly reduced by the metal coating.
3. This is followed by the bearing structure of the satellite (that is, the actual satellite body), which often has an aluminum construction. In this case, suspension of the solar generator panel must either be statically defined or take place by means of a "soft" suspension which compensates the different temperature-caused deformations, in which case it must be taken into account that such suspension always has a thermal insulating effect.

In the described embodiment a front-constructed separate panel is required in addition to the actual load-bearing structure of the satellite.

Polyimides have long been used in space operations, and play an important role particularly in the field of insulation foils (for example, "Capton" foils as exterior layers of the above-described MLIs). Furthermore, they are used as open-pore foam for sound insulation on the interior of payload panelings for carrier rockets (U.S. Pat. No. 5,670,758).

It is an object of the invention to provide a structure for the thermal insulation of satellites which achieves the following goals:

Reduction of the overall mass of the satellite;
reduction of the design expenditures;
simplification of construction and of the integration;
savings as the result of fewer manual operations (MLI adaptation, etc.).

These and other objects and advantages are achieved by the method and apparatus for the thermal insulation of satellites according to the invention, in which a layer of open-pore polyimide foam is applied directly to the satellite bearing structure.

Because of the good thermal insulation qualities of the polyimide foam, the temperature range of the bearing structure of the satellite disposed underneath is moderate. Therefore, a front-constructed separated panel, as used in the known structures, is not necessary. Moreover, the bearing structure may be constructed particularly as a low-cost aluminum sandwich because no critical thermal deformations occur due to the good thermal insulation properties of the polyimide foam.

The structure according to the invention has the following advantages:

Because of the elimination of the need for separate panels, the overall mass of the satellite is reduced.

Since fewer components and interfaces are required compared to the known structure, design expenditures are reduced.

The construction and the integration of the structure are simplified (good mechanical working, easy handling).

Fewer manual operations are required, which saves costs.

The thermal insulation effect of the structure according to the invention is in the same range as that of the known structures in which MLI's are used. It also has a sufficient mechanical bearing capacity.

In addition, the structure according to the invention has no effect on the standardized solar cell mounting, as it is used in the case of the known solar generators.

Other objects, advantages and novel features of the present invention will become apparent from the following detailed description of the invention when considered in conjunction with the accompanying drawings.

DETAILED DESCRIPTION OF THE DRAWINGS

Figure 1:
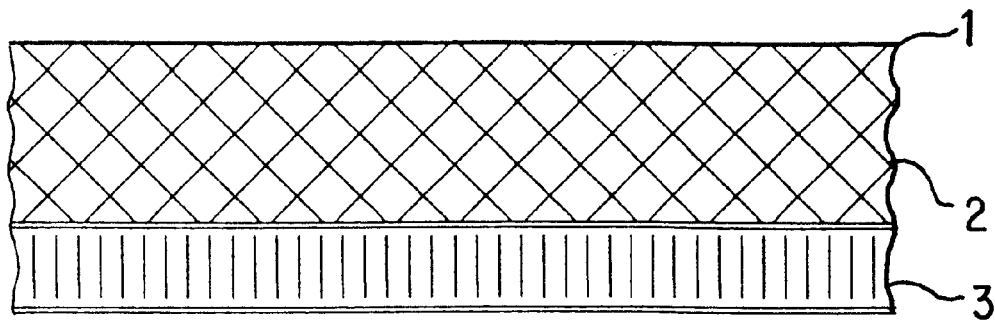
FIG. 1 shows a structure according to the invention for thermal insulation of satellites in the example of a stationary solar generator.
Figure 2:
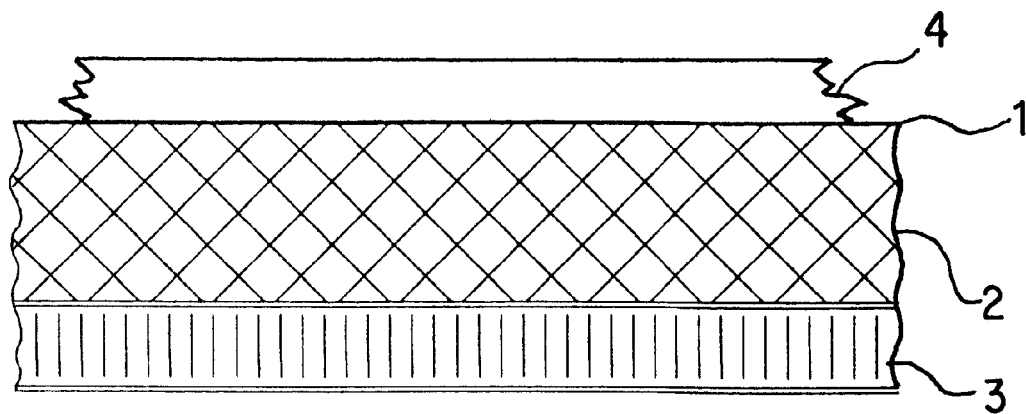
FIG. 2 shows the thermal insulation structure of FIG. 1, with an array of solar cells mounted thereon.

As shown in the figure, the following layer construction is provided:

Cover layer 1 (thickness of 0.6 mm) made of a carbon-fiber-reinforced plastic on which the solar cells 4 are mounted (FIG. 2). The cover layer comprises, for example, 6 fiber layers with a 0°/90°/45°/135°/90°/0° fiber orientation.

Open-pore polyimide foam 2 (thickness of 40 mm) with a density of 50 kg/m³.

Aluminum sandwich 3 (2 Al cover layers—thickness of 1 mm—and an Al core—thickness of 18 mm—) as the satellite bearing structure.

Polyimide foam 2 is a commercially available product which can be ordered by a manufacturer in different densities and thicknesses, corresponding to the application. The aluminum sandwich contains the fastening elements (inserts, not shown in the drawing) for the connection with adjacently arranged sandwiches.

The cover layer 1, the polyimide foam 2 and the aluminum sandwich 3 as well as the core and the cover layers of the aluminum sandwich are glued to one another by means of conventional structure glues suitable for space operations.

As a result of the thermal insulation in the area between the cover layer 1 and the actual bearing structure, the temperature range of the aluminum sandwich panel 3 is moderate, which makes this panel 3 usable as part of the satellite bearing structure. Since no critical thermal deformations will occur, the aluminum sandwich can be lower in cost in comparison to the carbon fiber construction.

The use of the polyimide foam for the thermal insulation of the exterior surfaces of the satellite is not limited to stationary solar generators. The same construction principle can also be used for obtaining, in addition to the thermal insulation, a high evenness and stability of the exterior side of the satellite. In this case, smaller instruments (such as sensors) can be embedded directly in the foam, thereby eliminating difficult MLI constructions with a lower insulation effect.

For a protection against damaging environmental influences from space, any outer covering layer can be applied to the polyimide foam. Particularly CFK, aluminum or any other known surface coating can be used for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermal insulation structure for a satellite, comprising:

a layer of an open-pore polyimide foam adhering on an exterior surface of the satellite;

a cover layer applied to an outwardly exposed surface of the open-pore polyimide foam; and an array of solar generators affixed to the cover layer.

2. The thermal insulation structure according to claim 1, wherein the cover layer comprises a carbon-fiber-reinforced plastic or aluminum.

3. The thermal insulation structure according to claim 1, wherein a bearing structure of the satellite comprises an aluminum sandwich.

4. The thermal insulation structure according to claim 1, wherein the layer of open pore polyimide foam is glued directly to said exterior surface.

5. A spacecraft comprising:

a spacecraft body which includes a bearing structure;

a layer of an open pore polyimide foam adhering on an exterior surface of the bearing structure; and a cover layer applied to an outwardly exposed surface of the open-pore polyimide foam; and an array of solar generators affixed to the cover layer.

6. A method for thermally insulating a spacecraft, comprising:

applying a layer of an open pore polyimide foam adhering on an exterior surface of said spacecraft;

applying a cover layer to an outwardly exposed surface of the open-pore polyimide foam; and affixing an array of solar generators to the cover layer.

7. The method according to claim 6, wherein the layer of open pore polyimide foam is glued directly to said exterior surface.

* * * * *